July 14, 1959  G. M. RAPATA  2,894,426
STUD FASTENER WITH FRICTIONAL GRIPPING MEANS
Filed Jan. 5, 1954  3 Sheets-Sheet 3
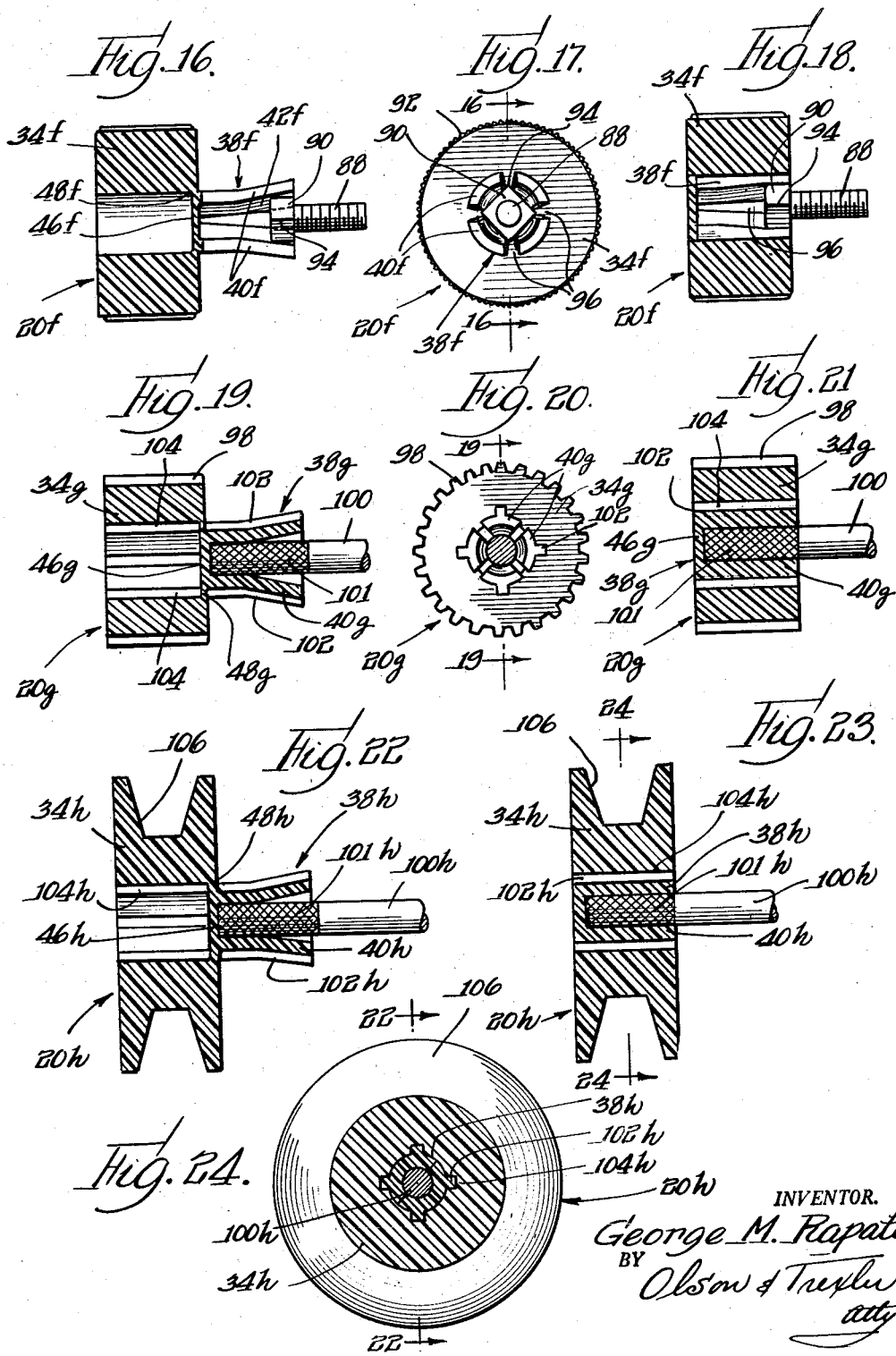
INVENTOR.
George M. Rapata
BY
Olson & Trexler
attys United States Patent Office 2,894,426
Patented July 14, 1959

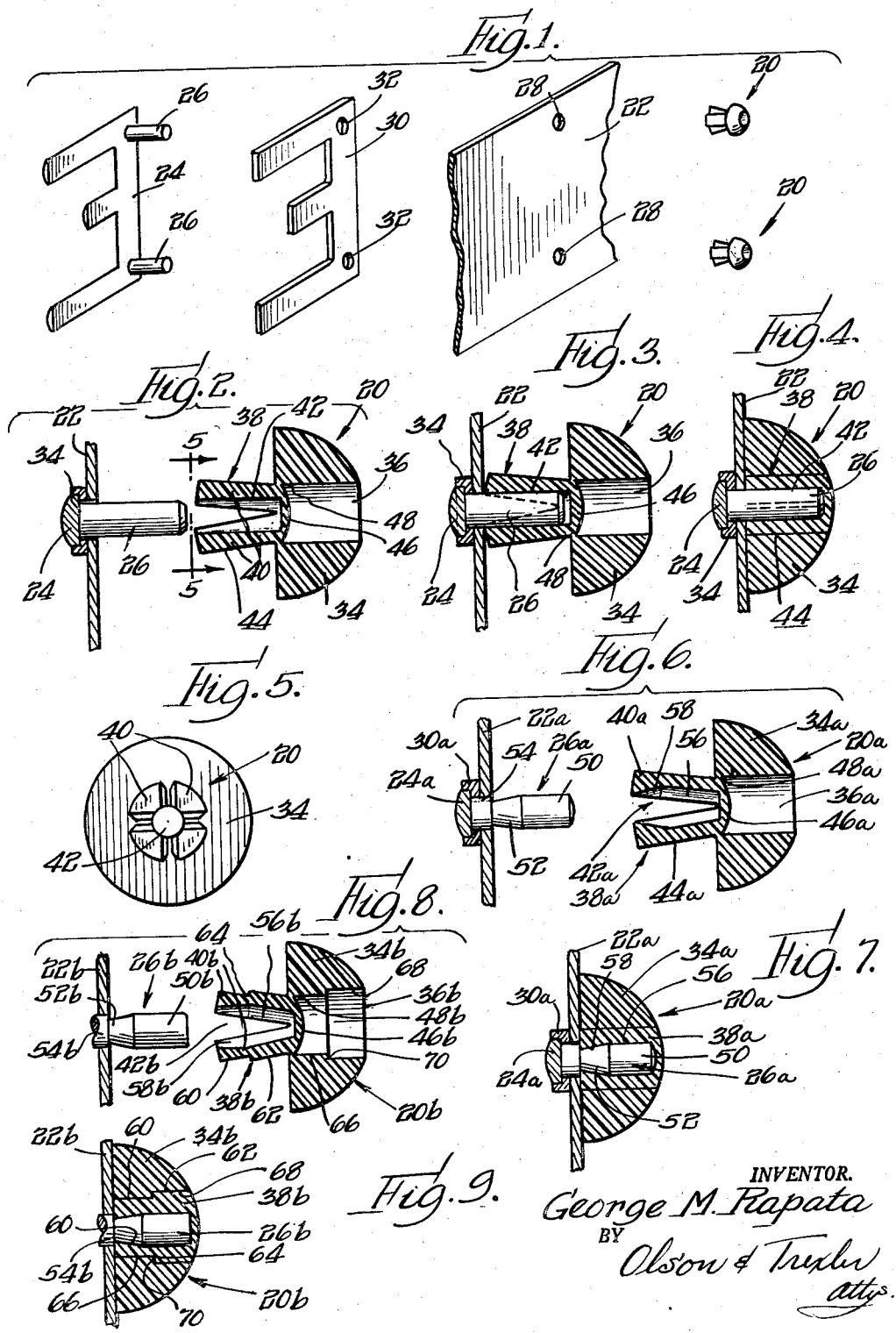

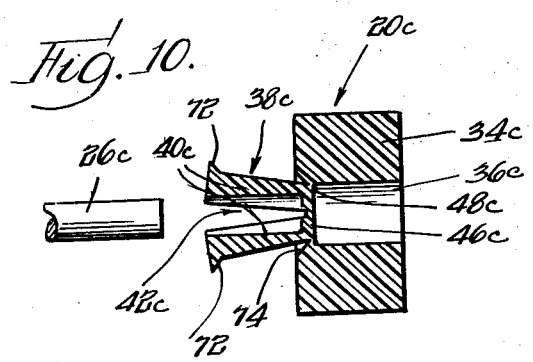
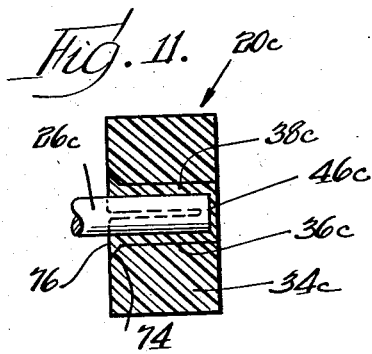
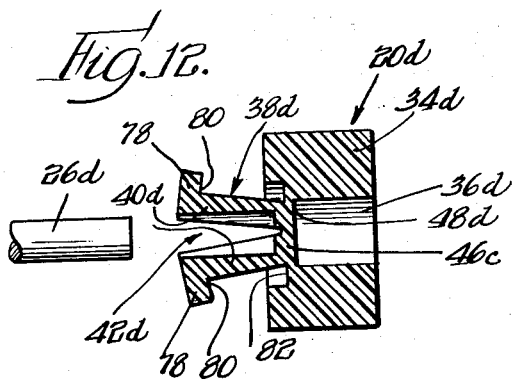
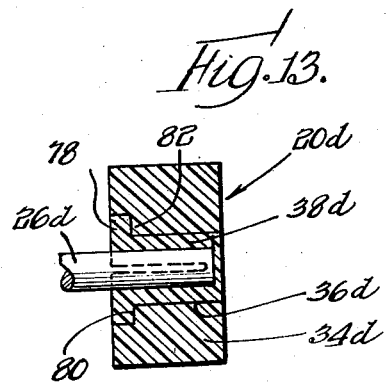
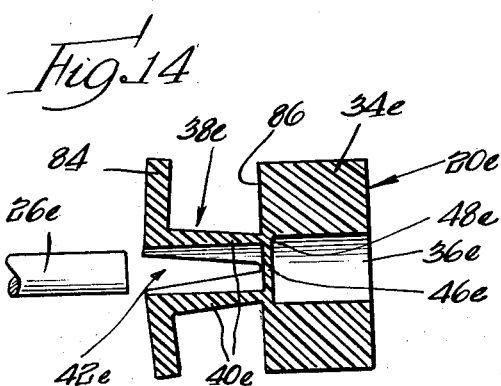
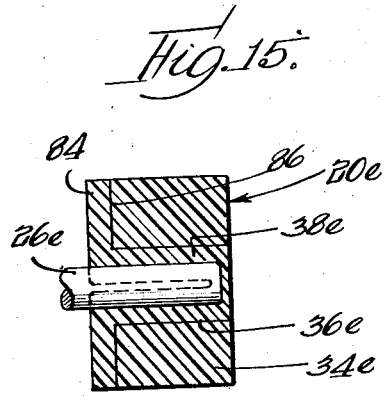

2,894,426

STUD FASTENER WITH FRICTIONAL GRIPPING MEANS

George M. Rapata, Chicago, Ill., assignor to Illinois Tool Works, Chicago, Ill., a corporation of Illinois Application January 5, 1954, Serial No. 402,326

5 Claims. (Cl. 85—36)

This invention is concerned generally with fasteners, and more particularly with fasteners of the type adapted to hold studs such as those which might project through a sheet metal panel from indicia or ornamentation mounted on such panel.

Automobiles, washing machines, refrigerators, and other appliances and articles of manufacture often have indicia or ornamentation mounted on the outside of a sheet metal panel and held in place by means of studs attached to or formed integral with the indicia or ornamentation, such studs extending through suitable apertures in the panel and held behind the panel by suitable fasteners. Threaded fasteners are not entirely satisfactory for several reasons. The studs and fasteners must be threaded, thus adding to the original cost of the parts. Furthermore, threading fasteners onto the studs takes a considerable amount of time, and the studs often are in such position as to make threading on of a fastener extremely difficult. Other types of fasteners generally have been expensive to manufacture, or difficult to apply, or made of materials which frequently are in short supply, or have other failings.

Accordingly, it is an object of this invention to provide a fastener for securing studs, such fastener being inexpensive, made of readily available materials, and being simple to install.

A further object of this invention is to provide a new or improved fastener for frictionally gripping the ends of studs to hold the studs in place.

Another object of this invention is to provide a fastener for positively locking on the ends of studs.

Another object of this invention is to provide a fastener or gripper member for mounting on shafts or studs through relative telescoping of the parts of the fastener or member, whereby to provide means for rotating the shaft or stud.

Yet another object of this invention is to provide a fastener for frictionally or positively locking on the end of a complementary stud when a single locking element of the fastener is axially driven into telescoping association with a hollow gripping element.

An additional object of this invention is to provide a fastener for studs wherein a gripping element is locked on the end of a stud by relative axial movement of a holding element onto the gripping element, and wherein the holding element positively locks on the gripping element to preclude unauthorized separation thereof.

Further objects of this invention are to provide a fastener for studs which seals the aperture through which a stud projects, which is adapted for one hand application, and which is made of a readily available and durable plastic material such as polyethylene or nylon.

Other and further objects and advantages of the present invention will be apparent from the following description when taken in connection with the accompanying drawings wherein:

Fig. 1 is an exploded perspective view of a part to be secured on the face of a sheet metal panel, the panel, and the fastener to secure the part thereon;

Fig. 2 is a cross sectional view through the panel showing the mounting of the part thereon before the fastener is placed in position;

Fig. 3 is a view similar to Fig. 2 before driving of the fastener to fastening position, but after initial installation on the end of the stud;

Fig. 4 is a view similar to Figs. 2 and 3 showing the fastener in fastening position;

Fig. 5 is an end view of the fastener as taken along the line 5—5 in Fig. 2;

Fig. 6 is a cross sectional view similar to Fig. 2 showing a modified form of the invention wherein the fastener positively locks on the stud;

Fig. 7 is a view similar to Fig. 6 and showing the fastener positively locked on the stud;

Fig. 8 is a view similar to Figs. 2 and 6 and illustrating a second embodiment of the invention wherein the fastener locks on the stud, and the relatively telescoping parts of the fastener lock on one another;

Fig. 9 is a view similar to Fig. 8 showing the parts in final, telescoped, locked relation;

Fig. 10 is a cross sectional view similar to Fig. 2 showing a further modified form of the invention wherein means are provided to prevent the parts from being telescoped too far together;

Fig. 11 is a view similar to Fig. 10 showing the parts in telescoped, holding relation;

Fig. 12 is another view generally similar to Fig. 2 and showing a further modified form of the invention;

Fig. 13 is a view similar to Fig. 12 showing the parts in telescoped, holding position;

Fig. 14 is another view generally similar to Fig. 2 of a further modified form of the invention providing a shoulder precluding axial thrust on the holding member of the fastener;

Fig. 15 is a view similar to Fig. 14 showing the parts in telescoped assembled relation;

Fig. 16 is an axial sectional view taken along the line 16—16 of Fig. 17 generally similar to Fig. 2 showing the invention as adapted to form a large driving head on a threaded stud;

Fig. 17 is an end view of the combination illustrated in Fig. 16 and taken from the stud end thereof;

Fig. 18 is an axial sectional view similar to Fig. 16 with the parts telescoped;

Fig. 19 illustrates another embodiment of the invention and constitutes an axial sectional view taken along the line 19—19 of Fig. 20;

Fig. 21 is a view similar to Fig. 19 showing the parts telescoped;

Fig. 22 is a further embodiment of the invention constituting an axial sectional view taken along the line 22—22 in Fig. 24;

Fig. 23 is a view similar to Fig. 22 showing the parts telescoped; and

Fig. 24 is a cross-sectional view taken along the line 24—24 of Fig. 23.

Referring now in greater particularity to the drawings, wherein like numerals have been utilized to designate similar parts throughout, the fastener is shown in one form in Figs. 1–5 and is identified generally by the numeral 20. The fastener is shown as used with a panel 22 of sheet metal or other suitable material. An article such as a capital letter E 24 is illustrated for attachment to the front of the panel and is provided with a pair of rearwardly projecting studs 26 which are adapted to extend through suitable apertures 28 in the panel 22. A pad 30 which is generally complementary to the article 24 and has apertures 32 for accommodating the studs preferably is interposed between the articles 24 and the panel 22. The pad 30 preferably is made of rubber or polyethylene and preferably has a peripheral flange 34 designed to lie along the external edges of the article 24.

The fastener 20 will be observed to comprise a cap 34 having a central cylindrical aperture 36, and a collapsable stud portion or shank 38. The stud portion or shank 38 comprises a plurality of fingers 40 defining a cylindrical aperture or bore 42 which is generally complementary to one of the studs 26. The outside of the collapsable stud or shank 38 is outwardly flared away from the cap 34 as will be observed at 44. The inner end of the collapsable stud portion or shank 38 is closed off with an integral cap 46, and the collapsable stud portion preferably is joined to the cap 34 by a circumferential shear section 48. The fastener 20 preferably is made of material which is strong and yet which will shear readily at the section 48, which will be forced into gripping position, and which has sufficient surface friction to retain a stud 26 in proper position. Plastic material is preferred for the fastener, and specific examples of desirable material include polyethylene and nylon.

The article 24 first is assembled with the pad 30 and with the panel 22 with the studs projecting rearwardly of the panel. A fastener then is aligned with each stud as illustrated in Fig. 2, and the fastener is slipped over the stud as shown in Fig. 3. The cap 34 then is driven over the collapsable stud portion or shank 38 of the fastener as shown in Fig. 4, the transverse dimensions of the shank adjacent the cap corresponding substantially with the dimensions of the aperture in the cap to facilitate wedging movement of the cap over the shank. The cap wedges tightly onto the collapsable stud portion to deform the same into gripping engagement with the stud 26. This deformation squeezes the fingers somewhat outwardly into the spaces between the fingers, and causes the collapsable stud portion 38 to grip the stud 26 aggressively.

In many instances, frictional locking of the fastener on the stud and of the cap on the shank is sufficient. However, there may sometimes be some axial retractive forces impressed on the stud. A modification of the invention is shown in Figs. 6 and 7 and illustrates a fastener which positively locks on the stud. The fastener is generally similar to that previously disclosed, and similar parts are identified by similar numerals with the addition of the suffix *a*. The stud 26*a* as shown in Fig. 6 is provided with an end portion 50 of cylindrical configuration. The stud then converges frusto-conically as shown at 52 as a panel, where it is again of cylindrical configuration as identified by the numeral 54. The interior 42*a* of the collapsable stud portion 38*a* comprises a portion 56 which diverges from the cap 34*a*, and then converges as illustrated at 58, this internal configuration being generally complementary to the projecting end of the stud 26*a*. When the cap 34*a* is driven over the collapsable stud portion 38*a* the outwardly diverging surface 44*a* defined by the fingers 40*a* causes the collapsable stud portion 38*a* to be wedged tightly in place within the cap 34*a* as shown in Fig. 7 with the converging internal portion 58 of the collapsable stud portion snugly gripping the converging portion 52*a* of the stud 26*a*. The diverging internal portion 56 is moved into contact with the cylindrical stud portion 56 for frictional gripping thereof in addition to the positive securing by means of the portions 58 and 52.

In certain instances where extreme permanence of assembly is desired, it may be desirable to have the cap positively lock on the collapsable stud portion thereof when the fastener is telescoped. This will retain the two parts together more permanently than will the frictional gripping previously disclosed, and indeed prevents disassembly without destruction of the fastener. An embodiment of the invention constructed in accordance with such requirements for extreme permanence is shown in Figs. 8 and 9. The parts shown in these figures are generally similar to those previously described, and the similar parts are identified by the same numerals heretofore used with the addition of the suffix *b*. Only the modified parts will be described with particularity, thereby forming a complete disclosure without introducing undue prolixity. The stud 26*b* projecting through the panel 22*b* is of the locking type just described, and the interior opening of the collapsable stud portion of the fastener is formed complementary in configuration to the stud 26*b* as indicated at 42*b*. The collapsable stud portion 38*b* of the fastener 20*b* is joined to the cap 34*b* by a shear section 48*b* as previously described. The important difference in this modification resides in the external configuration of the collapsable stud portion 38*b*, and the internal configuration of the central bore 36*b*, of the cap. The collapsable stud portion is formed with two frusto-conical outer surfaces, one of these outer surfaces 60 being adjacent the outer end of the collapsable stud portion and of relatively small diameter. The other, and larger frusto-conical portion 62 is positioned adjacent the cap 34*b* so that a retaining shoulder 64 is formed between the two frusto-conical portions. It is to be understood that although these portions 60 and 62 are frusto-conical as shown in Fig. 8, when the fastener is telescoped into holding position, they are deformed into generally cylindrical form as shown in Fig. 9. This cap opening 36*b* is provided with a relatively small cylindrical configuration 66 at the inner end thereof, and with a relatively large cylindrical configuration 68 at the outer end thereof, these two cylindrical portions forming an intermediate shoulder 70. When the cap is driven over the collapsable stud portion as shown in Fig. 9, the collapsable stud portion locks on the stud 26*b* as previously described. In addition to this, the shoulders 64 and 70 engage one another with the small diameter portion 60 of the collapsable stud portion fitting snugly within the complementary portion 66 of the cap opening, and with the larger collapsable stud portion 62 fitting snugly within the cooperable cap opening portion 68. The engagement of the shoulders 64 and 70 positively precludes withdrawal of the cap, and this prevents removal of the fastener from the stud, thereby providing extreme permanence of fastening.

In the first two embodiments of the invention disclosed, wherein the cap fits frictionally on the collapsable stud portion of the fastener after telescoping, only the end of the collapsable stud portion can be used as a bearing surface. It is obvious that if any axial pressure were applied to the under surface of the cap, the cap would be forced off of the collapsible stud portion and the stud to be fastened no longer would be gripped thereby. In the last embodiment disclosed wherein the cap locks on the collapsable stud portion, the cap as well as the collapsable stud portion can serve as a bearing surface. In all of these forms, the length of the stud to be fastened and the depth of the opening or recess in the collapsable stud portion of the fastener must be substantially identical. If the stud were longer than the depth of the recess, then the collapsable stud portion of the fastener would not engage the mounting panel, and the cap could be driven too far over the stud to be fastened. Three embodiments of the invention are shown in Figs. 10–15 wherein it is impossible to drive the cap too far over the collapsable stud portion. In these three embodiments, the same numerals are used for similar parts as have been used previously with the addition of the subscripts *c*, *d*, and *e* respectively. The specifically different parts are hereinafter pointed out in detail.

The three embodiments of the invention illustrated in Figs. 10–15 further are provided with wide bearing surfaces. With these wide bearing surfaces, and the provision for preventing driving of the cap too far over the collapsable stud portion, the fastener may have use for gripping on the ends of studs in general without assembling the studs with the fastener engaging panel. Accordingly, these three embodiments have been illustrated solely with a stud, and omitting the panel and any article which may be secured to or formed integral with the stud. In each of these embodiments the cap is shown as frictionally gripping the collapsable stud portion after telescoping, but it will be apparent that the cap could lock on the stud portion as disclosed with regard to Figs. 8 and 9. The three embodiments of the invention shown in Figs. 10–15 are illustrated as having heads or caps which are rectangular in longitudinal section, rather than button shaped as in the previous embodiments. It will be understood that these three embodiments also would have button shaped heads, but the rectangular section caps as illustrated may prove to be useful as stops on the ends of studs or shafts. The first of these three embodiments, namely that shown in Figs. 10 and 11, is provided with an outwardly flaring collapsable stud portion 38c similar to the previously disclosed embodiments. However, the outermost ends of the fingers comprising the collapsable stud portion are further flared outwardly as illustrated at 72, and the under surface or face of the cap 34c is bevelled as at 74 around the collapsable stud portion for cooperation with the outwardly flared or bevelled finger portions 72. The shear section 48c necessarily is set back inwardly from the under surface or face of the cap 34c as readily may be seen. The cap or closed inner end of the collapsable stud portion as illustrated at 46c limits insertion of the stud or shaft 26c, and the cap 34c may be telescoped over the collapsable stud portion 38c until the outwardly flared or bevelled finger portions 72 engage the bevelled recess 74 as illustrated in Fig. 11. The bearing surface 76 provided at the end of the collapsable stud portion is larger than those previously disclosed (exclusive of the cap), and therefore may resist retraction from the stud or shaft 26c without the chance of being pulled through an aperture in a panel, bearing, stop, or the like.

The embodiment of the invention shown in Figs. 12 and 13 is generally similar to that shown in Figs. 10 and 11, and differs in that the fingers or arms forming the outwardly flared collapsable stud portion 38d are provided on their outer ends with outward projections 78 forming square shoulders 80. The under surface or face of the cap 34d is provided with a ringlike recess 82 which is generally rectangular in cross section, and which is complementary to the outward projections 78. Thus, when the cap 34d is driven over the collapsable stud portion 38d as shown in Fig. 13, the shoulder 80 formed by each outward projection 78 seats against the bottom of the complementary recess 82 to limit the relative telescoping of the cap and the collapsable stud portion. The limitation in this modification of the invention is somewhat more positive than in Figs. 10 and 11, although the latter may be preferred because of the additional wedging action obtained.

Another embodiment of the invention as shown in Figs. 14 and 15 provides an even larger stop limiting telescoping than previously disclosed, and further incorporates an even larger bearing surface on the collapsable stud portion. The configuration of the embodiment in Figs. 14 and 15 is generally similar to that in Figs. 12 and 13, except that the collapsable stud portion 38e is provided on the outer ends of its fingers with outwardly projecting circular segments 84 which are equal in diameter to the cap portion 34e when the collapsable stud portion is collapsed as shown in Fig. 15. These outwardly projecting segments thus engage the entire under surface or face 86 of the cap 34e to form an extremely positive stop limiting telescopic association of the parts of the fastener. The large diameter of the circle made up by the segments 84 provides a large bearing surface without resort to the cap itself as a bearing surface.

In the various embodiments of the invention heretofore disclosed the fastener has been described as a stop member. It is contemplated that the fastener also could be used as a rotary drive member, and several embodiments disclosing the fastener as a rotary drive member are shown in Figs. 16–24. In the first of these embodiments, as shown in Figs. 16–18, the fastener is adapted for use as an enlarged driving head on a threaded stud. Specifically, there is illustrated a threaded stud 88 having a square head 90 thereon. It will be appreciated that the head could have any other polygonal or non-circular configuration, and that the square shape has been chosen by way of illustration. The collapsible stud portion of shank 38f comprises a plurality of outwardly flared fingers 40f similar to those previously disclosed, the inner end of the shank portion conveniently, although not necessarily being closed off with an integral cap 46f. The cap 34f of the fastener 20f is attached to the collapsible stud portion or shank by means of a shear section 48f as in the embodiments previously disclosed. The cap 34f is rectangular in longitudinal section, and is circular in cross section. The periphery of the cap is knurled or otherwise provided with a finger grip as at 92.

The fastener, or drive member as it may now be termed, is utilized in a manner generally similar to that previously disclosed. The square head 90 of the stud 88 is inserted into the space 42f between the fingers 40f of the shank or collapsible stud portion with the corners 94 of the head generally extending into the spaces 96 between the fingers. When the fastener or drive member 20f is telescoped to the position shown in Fig. 18, it tightly grips the head 90 of the stud 88. The fastener or drive member 20f thus forms an enlarged knob for rotating the stud 88 easily by the fingers without the necessity of utilizing any tools to thread the stud 88 into place. This is particularly advantageous in assembling parts which must be disassembled from time to time, as the procedure is speeded up and simplified, and the possibility of marring the parts with a tool is positively precluded. It will be apparent that the knurled fastener or drive member could similarly be assembled to the polygonal end of a shaft such as might be used for a control in a radio or television receiver. It will be obvious that the number of fingers 40f can be varied as necessary for proper cooperation with the polygonal head of the stud.

Another type of driving member is illustrated in Figs. 19–21 and is identified by the numeral 20g. In this form of the invention the cap 34g takes the form of a gear having peripherally disposed gear teeth 98. The shank or collapsible stud portion 38g remains generally as before, comprising a plurality of fingers 40g interconnected by an integral end piece or cap 46g. Since rotary motion is to be transmitted, the part of the member to be gripped, illustrated as a shaft 100, is knurled as shown at 101. It will be appreciated that the knurling could be replaced by a polygonal or non-circular configuration if desired. The outside surfaces of the fingers 40g preferably are provided with integral keys 102 which fit into keyways 104 in the cap 34g when the parts are telescoped. It will be appreciated that complementary polygonal or non-circular configurations could be used in place of the keys and keyways to insure a rotary driving connection. Thus, when the parts of the fastener or drive member are telescoped as in Fig. 21, the gear is mounted firmly on the shaft 100 for rotation therewith.

The final embodiment of the invention as illustrated in Figs. 22–24 is in large measure similar to that illustrated in Figs. 19–21 in that it is designed for rotation with a shaft. The cap 34h of the drive member 20h this time takes the form of a pulley having a peripheral groove 106 for receiving a drive belt. It will be appreciated that this groove can have any configuration adapted for use with conventional pulley belts. The shank or collapsible stud portion 38h again comprises a plurality of outwardly flared fingers 40h and an integral end cap or piece 46h. The fingers preferably are provided with splines or keys 102h, and the interior of the cap 34h is provided with complementary keyways 104h, or any other suitable or known means may be utilized to lock the cap 34h for rotation relative to the fingers 40h after they have been telescoped. The shank is attached to the cap by a shear section 48h as in the previous embodiments. The shaft 100h is knurled as at 101h non-rotatably to receive the drive member 20h, or the shaft may be otherwise suitably constructed to insure its rotation with the drive member or pulley.

It now will be apparent that the fastener as shown and described herein is relatively inexpensive to produce, is made of readily available materials, and is easy to handle. It may be readily installed and locked in place with one hand and securely holds the stud, either frictionally or positively locking thereon as disclosed in the various embodiments of the invention. The fastener in some of the embodiments is limited as to relative telescoping of the parts, and large bearing surfaces are provided in many of the embodiments. In each embodiment of the invention the fastener effectively seals an aperture through which a stud may be inserted for fastening, and the relatively telescoped parts of the fastener may be locked against relative separation.

Throughout the claims it will be understood that wherever the term "fastener" is used, it is intended that this term should be interpreted to cover all of the forms of the invention including those where the article is intended to grip a stud for acting as a stop member, and also including those wherein the article is to fasten on to a stud or other shaft for rotary motion therewith.

While several embodiments of the invention have been shown, it will be understood that this invention is capable of other modifications and changes without departing from the spirit and scope of the appended claims. Thus, the invention is not limited to the specific forms herein illustrated, but is to be limited only by the scope of the appended claims.

The invention is hereby claimed as follows:

1. A one-piece plastic fastener for a stud or the like, including a substantially rigid cap having a central axial bore extending from a first face thereof to a point immediately adjacent an opposite face axially spaced therefrom, and a shank of deformable material provided with a stud accommodating axial opening, said shank extending axially from the second face of the cap co-extensive with and substantially equal in axial length to the bore in said cap, communication between the opening in the shank and the bore in the cap being closed by a relatively small transverse shank end wall portion, the outer periphery of which integrally joins said cap adjacent said second face along a circumferential area of limited cross section which may be readily fractured when force is applied, to telescopically assemble said shank and cap; the extremity of said shank oppositely disposed from the closed end thereof being longitudinally slotted so as to provide transversely yieldable shank sections with the exterior surfaces thereof initially presenting a peripheral dimension greater than at least a portion of the inner periphery of said bore and inclining inwardly from the greater peripheral dimension toward said bore, the axial opening in said shank being adapted to accommodate a complementary stud member so that after complete telescopic association of the stud within said shank, continued axial force applied to the shank and cap in opposed directions will cause fracture of the stock of limited cross section and the ultimate positioning of the exposed surface of said transverse wall in substantially flush relation with the first surface of the cap and resilient gripping of the shank within the cap and against the outer periphery of a telescopically associated stud by inward wedging of the exterior surfaces of the shank sections as they engage the reduced periphery of said bore.

2. A one-piece plastic fastener as claimed in claim 1, wherein the shank is provided with inwardly projecting means adapted to interlock with a complementary portion of the stud when the cap is telescoped with the shank.

3. A one-piece plastic fastener as claimed in claim 1, wherein the shank and cap are respectively provided with cooperating external and internal locking portions to lock the cap on the shank following telescopic association therewith.

4. A one-piece plastic fastener as claimed in claim 1, wherein the shank is provided with an inwardly projecting section adapted to interlock with a complementary portion on the stud when the cap and shank are telescopically associated with one another, and wherein the outside of the shank and the inside of the cap are provided with complementary locking means adapted to lock the cap and shank together upon telescopic association therebetween.

5. A one-piece plastic fastener as claimed in claim 1, wherein there are provided mutually interfitting complemental projecting portions on the shank and around the bore in the cap for preventing relative rotation between the cap and the shank after telescopic association therebetween.

References Cited in the file of this patent

UNITED STATES PATENTS

| | | |
|---|---|---|
| 426,048 | Neill | Apr. 22, 1890 |
| 942,693 | Wintermute | Dec. 7, 1909 |
| 1,005,227 | Jones | Oct. 10, 1911 |
| 1,185,402 | Hopkins | May 30, 1916 |
| 1,531,916 | Flintjir | Mar. 31, 1925 |
| 1,557,099 | Schulze | Oct. 13, 1925 |
| 1,739,286 | Bronson | Dec. 10, 1929 |
| 2,295,899 | Hoppenstand | Sept. 15, 1942 |
| 2,367,480 | Beswick | Jan. 16, 1945 |
| 2,402,287 | Kearns | June 18, 1946 |
| 2,424,602 | De Swart | July 29, 1947 |
| 2,439,845 | De Swart | Apr. 20, 1948 |
| 2,664,458 | Rapata | Dec. 29, 1953 |

FOREIGN PATENTS

| | | |
|---|---|---|
| 722,839 | France | Jan. 5, 1932 |